(12) United States Patent
Wada

(10) Patent No.: US 8,577,540 B2
(45) Date of Patent: Nov. 5, 2013

(54) METHOD AND APPARATUS FOR DETECTING TIRE HAVING DECREASED INTERNAL PRESSURE, AND PROGRAM FOR DETECTING TIRE HAVING DECREASED INTERNAL PRESSURE

(75) Inventor: Mitsuhiro Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 351 days.

(21) Appl. No.: 12/900,646

(22) Filed: Oct. 8, 2010

(65) Prior Publication Data

US 2011/0190974 A1    Aug. 4, 2011

(30) Foreign Application Priority Data

Jan. 29, 2010  (JP) .................................. 2010-018752
Mar. 5, 2010   (JP) .................................. 2010-049243

(51) Int. Cl.
*G01M 17/02*  (2006.01)
*G01L 17/00*  (2006.01)
*G06F 17/00*  (2006.01)
*B60C 23/00*  (2006.01)

(52) U.S. Cl.
USPC ......................... 701/29.1; 701/32.9; 701/124

(58) Field of Classification Search
USPC ........... 340/442–444; 701/1, 29.1, 31.4, 32.9, 701/33.1, 36, 91, 98, 124
See application file for complete search history.

(56) References Cited

FOREIGN PATENT DOCUMENTS

| EP | 1 527 909 A2 | 5/2005 |
|----|--------------|--------|
| JP | 63-305011 A | 12/1988 |
| JP | 2005-1419 A | 1/2005 |
| JP | 2005-126013 A | 5/2005 |
| JP | 2005-153544 A | 6/2005 |

*Primary Examiner* — Khoi Tran
*Assistant Examiner* — Dale Moyer
(74) *Attorney, Agent, or Firm* — Birch, Stewart, Kolasch & Birch, LLP

(57) ABSTRACT

A method for detecting a tire having a decreased internal pressure by making a relative comparison of wheel speeds of tires. The method includes a step of detecting wheel rotation information of the respective tires of the vehicle; a step of calculating wheel speeds based on the detected wheel rotation information; a step of calculating a decreased pressure determination value; and a step of determining a tire having a decreased internal pressure. The method further comprises a step of setting a threshold value, in which the predetermined threshold value is set based on a decreased pressure sensitivity calculated from a relation between a load sensitivity and a decreased pressure sensitivity during vehicle turning with regard to tires that is calculated in advance and a load sensitivity obtained through a turning running during initialization.

10 Claims, 10 Drawing Sheets

METHOD AND APPARATUS FOR DETECTING TIRE HAVING DECREASED INTERNAL PRESSURE, AND PROGRAM FOR DETECTING TIRE HAVING DECREASED INTERNAL PRESSURE

TECHNICAL FIELD

The present invention relates to a method and an apparatus for detecting a tire having a decreased internal pressure, and a program for detecting a tire having a decreased internal pressure.

BACKGROUND ART

There has been known a method for indirectly detecting whether a tire has a decreased pneumatic pressure by making a relative comparison among angular velocities of tires attached to a vehicle (see Patent Literatures 1 and 2 for example).

According to these methods, running statuses of a vehicle are limited (to a status where the vehicle is running at a fixed speed on a straight flat road). The methods make a relative comparison among the wheel speeds of the four wheels under the above running status. When only one wheel of the four wheels shows an increased wheel speed, these methods determine that the increased wheel speed is caused by the fact that a dynamic loaded radius (DLR) of the tire is reduced due to a decreased pressure, then issue an alarm.

The relative comparison is carried out by using a decreased pressure determination value (DEL) as shown in the following formula (1) for example. When this decreased pressure determination value exceeds a predetermined threshold value, these methods determine that a decreased pressure is caused.

$$DEL=\{(F1+F4)/2-(F2+F3)/2\}/\{(F1+F2+F3+F4)/4\}\times 100(\%) \qquad (1)$$

In the formula, F1 to F4 represent the angular velocities of a left-front wheel, a right-front wheel, a left-rear wheel, and a right-rear wheel, respectively.

In this case, there are shown no clear criteria that clarify how much reduction of the dynamic loaded radius (i.e., how much increase of the rotation number) leads the determination of a decreased pressure. Thus, a decreased pressure is determined when an appropriately-set threshold value is exceeded.

Citation List

Patent Literature

Patent Literature 1: Japanese Unexamined Patent Publication No. 305011/1988

Patent Literature 2: Japanese Unexamined Patent Publication No. 1419/2005

SUMMARY OF INVENTION

Technical Problem

By the way, the dependency of a tire dynamic loaded radius on the internal pressure (a degree of a change in the dynamic loaded radius due to a decrease of the tire internal pressure) is substantially the same in general depending on the tire size. Thus, when the magnitude or amount of a to-be-detected decrease of the internal pressure is determined, the decrease margin of the dynamic loaded radius due to the decrease of the internal pressure can be determined in a substantially-unique manner depending on each tire size.

The decrease margin of the dynamic loaded radius can be calculated by experiments. However, measuring any tires requires a very much labor and is not realistic. To solve this, in conventional methods including the method disclosed in Patent Literature 1, a case where typical tires are attached to a vehicle is assumed and the decreased pressure determination value that is calculated in consideration of a decrease margin when one tire has a 30%-decreased pressure for example has been used as the threshold value for determining a decrease of a tire internal pressure.

However, in the case of a general passenger vehicle, a plurality of sizes of tires generally exist that can be attached or are scheduled for attachment to the passenger vehicle. Thus, it is impossible to know, depending on an individual case, which size of tires among the plurality of available sizes are attached to the vehicle.

Therefore, when the determination criterion that is a threshold value in an apparatus for alarming a tire having a decreased internal pressure is determined as a predetermined value (fixed value), there may be a case where alarm cannot be accurately issued depending on some sizes of tires attached to the vehicle.

The present invention has been made in view of the situation as described above. It is an objective of the present invention to provide a method and an apparatus for detecting a tire having a decreased internal pressure, and a program for detecting a tire having a decreased internal pressure by which an alarm threshold value depending on a tire size can be set easily.

Solution to Problem

In accordance with a first aspect of the present invention, there is provided a method for detecting a tire having a decreased internal pressure (hereinafter also referred to as "detection method") by making a relative comparison of wheel speeds of tires attached to the respective wheels of a vehicle, comprising:

a step of detecting wheel rotation information of the respective tires of the vehicle;

a step of calculating wheel speeds based on the detected wheel rotation information;

a step of calculating a decreased pressure determination value by making a relative comparison of the calculated wheel speeds; and a step of determining a tire having a decreased internal pressure when the resultant decreased pressure determination value exceeds a predetermined threshold value, wherein the method further comprises a step of setting a threshold value, in which the predetermined threshold value is set based on a decreased pressure sensitivity calculated from a relation between a load sensitivity and a decreased pressure sensitivity during vehicle turning with regard to tires to be attached to the vehicle that is calculated in advance and a load sensitivity obtained through a turning running during initialization.

The detection method of the present invention uses a fact that a load shifts between left and right wheels during vehicle turning to thereby calculate a dynamic loaded radius change during turning, i.e., a dynamic loaded radius change rate due to a load shift or a load sensitivity. Then, a decreased pressure sensitivity is calculated based on a relation between a load sensitivity and a decreased pressure sensitivity during vehicle turning that is calculated in advance with regard to tires to be attached to the vehicle and a load sensitivity obtained through a turning running during initialization. Based on thus obtained decreased pressure sensitivity, a threshold value is set. The load shift during turning may occur in any vehicles. Thus, an alarm threshold value depending on a tire size can be set easily.

The load sensitivity can be calculated based on a relational expression between a ratio of the dynamic loaded radius change due to the load shift during turning to the dynamic loaded radius, the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

The vehicle can be a front-wheel drive vehicle or a rear-wheel drive vehicle, when assuming that the tire dynamic loaded radius is DLR, the tire dynamic loaded radius change is $\Delta$DLR, the load sensitivity is b, the vehicle gravity center height is H, the vehicle tread width is W, the vehicle mass is m, the vehicle lateral acceleration is $a_y$, and a load shift share rate of a driven wheel axis to all axes is $\alpha$, the relational expression can be represented as:

$$\Delta DLR/DLR = b \times \alpha \times (H/W) \times m \times a_y, \text{ and}$$

the load sensitivity can be a representative characteristic value of a load sensitivity represented by $b \times \alpha \times (H/W) \times m$.

The load sensitivity during vehicle turning regarding the to-be-attached tires can be a representative characteristic value of the load sensitivity, and the relation between the load sensitivity and the decreased pressure sensitivity can be represented by a linear function of the representative characteristic value and the decreased pressure sensitivity.

The load sensitivity can be estimated by the comparison between change amounts of the dynamic loaded radii of left and right driven wheels during vehicle turning that are obtained from the wheel speeds and change amounts of the dynamic loaded radii of left and right driving wheels during vehicle turning that are obtained from the wheel speeds. In this case, the load sensitivity can be estimated by the comparison between change amounts of the dynamic loaded radii of left and right driven wheels during vehicle turning and change amounts of the dynamic loaded radii of left and right driving wheels that are obtained from the wheel speeds. This comparison does not require a GPS apparatus or a special sensor for example, thus providing a simpler configuration to the apparatus.

In accordance with a second aspect of the present invention, there is provided an apparatus for detecting a tire having a decreased internal pressure (hereinafter also referred to as "detection apparatus") by making a relative comparison of wheel speeds of tires attached to the respective wheels of a vehicle, comprising:

a wheel rotation information detection means for detecting wheel rotation information of the respective tires of the vehicle;

a wheel speed calculation means for calculating wheel speeds based on the wheel rotation information detected by the wheel rotation information detection means;

a determination value calculation means for calculating a decreased pressure determination value by a relative comparison of the wheel speeds calculated by the wheel speed calculation means; and a determination means for determining, when the resultant decreased pressure determination value exceeds a predetermined threshold value, a tire having a decreased internal pressure, wherein the apparatus further comprises a threshold value setting means for setting the predetermined threshold value based on a decreased pressure sensitivity calculated from a relation between a load sensitivity and a decreased pressure sensitivity during vehicle turning with regard to tires to be attached to the vehicle that is calculated in advance and a load sensitivity obtained through a turning running during initialization.

The detection apparatus of the present invention uses a fact that a load shifts between left and right wheels during vehicle turning to thereby calculate a dynamic loaded radius change during turning, i.e., a dynamic loaded radius change rate due to a load shift or a load sensitivity. Then, a decreased pressure sensitivity is calculated based on a relation between a load sensitivity and a decreased pressure sensitivity during vehicle turning that is calculated in advance with regard to tires to be attached to the vehicle and a load sensitivity obtained through a turning running during initialization. Based on thus obtained decreased pressure sensitivity, a threshold value is set. The load shift during turning may occur in any vehicles. Thus, an alarm threshold value depending on a tire size can be set easily.

The load sensitivity can be calculated based on a relational expression between a ratio of the dynamic loaded radius change due to the load shift during turning to the dynamic loaded radius, the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

The vehicle can be a front-wheel drive vehicle or a rear-wheel drive vehicle, when assuming that the tire dynamic loaded radius is DLR, the tire dynamic loaded radius change is $\Delta$DLR, the load sensitivity is b, the vehicle gravity center height is H, the vehicle tread width is W, the vehicle mass is m, the vehicle lateral acceleration is $a_y$, and a load shift share rate of a driven wheel axis to all axes is $\alpha$, the relational expression can be represented as:

$$\Delta DLR/DLR = b \times \alpha \times (H/W) \times m \times a_y, \text{ and}$$

the load sensitivity can be a representative characteristic value of a load sensitivity represented by $b \times \alpha \times (H/W) \times m$.

The load sensitivity during vehicle turning regarding the to-be-attached tires can be a representative characteristic value of the load sensitivity, and the relation between the load sensitivity and the decreased pressure sensitivity can be represented by a linear function of the representative characteristic value and the decreased pressure sensitivity.

The load sensitivity can be estimated by the comparison between change amounts of the dynamic loaded radii of left and right driven wheels during vehicle turning that are obtained from the wheel speeds and change amounts of the dynamic loaded radii of left and right driving wheels during vehicle turning that are obtained from the wheel speeds. In this case, the load sensitivity can be estimated by the comparison between change amounts of the dynamic loaded radii of left and right driven wheels during vehicle turning and change amounts of the dynamic loaded radii of left and right driving wheels that are obtained from the wheel speeds. This comparison does not require a GPS apparatus or a special sensor for example, thus providing a simpler configuration to the apparatus.

In accordance with a third aspect of the present invention, there is provided a program for detecting a tire having a decreased internal pressure of the present invention (hereinafter also referred to as "program") which causes, in order to detect a tire having a decreased internal pressure by making a relative comparison of wheel speeds of tires attached to the respective wheels of a vehicle, a computer to function as:

a wheel speed calculation means for calculating wheel speeds based on wheel rotation information of respective tires of a vehicle;

a determination value calculation means for calculating a decreased pressure determination value by a relative comparison of the wheel speeds calculated by the wheel speed calculation means;

a determination means for determining, when the resultant decreased pressure determination value exceeds a predetermined threshold value, a tire having a decreased internal pressure; and a threshold value setting means for setting the predetermined threshold value based on a decreased pressure sensitivity calculated from a relation between a load sensitivity and a decreased pressure sensitivity during vehicle turning with regard to tires to be attached to the vehicle that is calculated in advance and a load sensitivity obtained through a turning running during initialization.

Advantageous Effects of Invention

According to a method and an apparatus for detecting a tire having a decreased internal pressure and a program for detecting a tire having a decreased internal pressure of the present invention, an alarm threshold value depending on a tire size can be set easily.

DESCRIPTION OF EMBODIMENTS

The following section will describe embodiments of a detection method and an apparatus and a program of the present invention in detail with reference to the attached drawings.

[First Embodiment]

Figure 1:
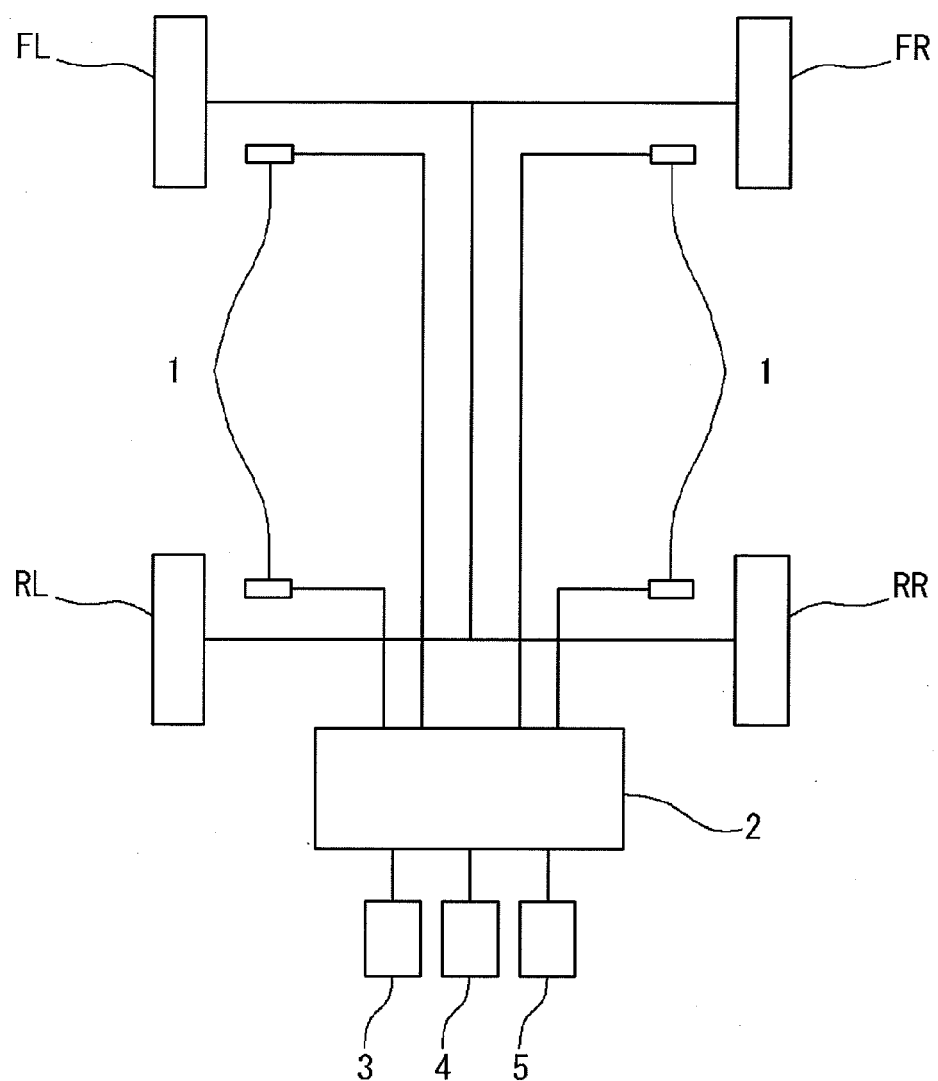
FIG. 1 is a block diagram illustrating one embodiment of a detection apparatus of the present invention.

As shown in FIG. 1, the detection apparatus according to one embodiment (First Embodiment) of the present invention includes, in order to detect the wheel rotation information regarding four tires attached to the four-wheel vehicle of FL (left-front wheel), FR (right-front wheel), RL (left-rear wheel), and RR (right-rear wheel), a normal wheel speed detection means (wheel rotation information detection means) 1 that is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses, or an angular velocity sensor such as the one that generates power using rotation as in a dynamo to measure an angular velocity and a wheel speed based on the voltage. The output from the wheel speed detection means 1 is given to a control unit 2 that is a computer such as ABS. This control unit 2 is connected to a display unit 3 comprising a liquid crystal display element, a plasma display element or CRT for example for displaying a tire having a decreased internal pressure, an initialization button 4 that can be operated by a driver, and an alarm unit 5 for notifying a driver of a tire having a decreased internal pressure. Although not shown, a yaw rate sensor for detecting a yaw rate and a lateral acceleration sensor for detecting a lateral acceleration are mounted in the vehicle.

Figure 2:
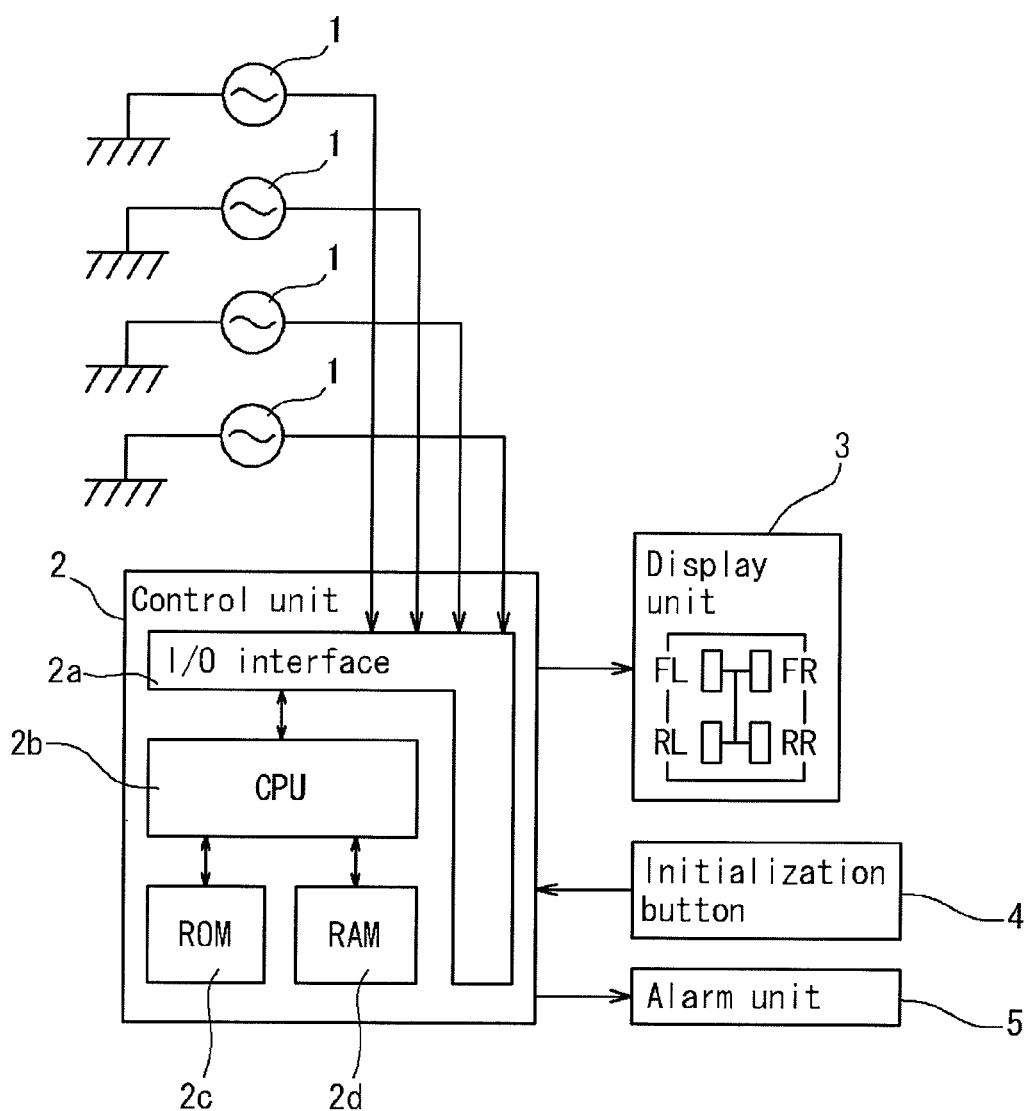
FIG. 2 is a block diagram illustrating the electrical configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d to which data is temporarily written when the CPU 2b performs a control operation or from which the written data is read out.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities of the respective tires at every predetermined sampling cycle $\Delta T(\sec)$ (e.g., $\Delta T=0.05$ second).

The detection apparatus according to the present embodiment comprises: a wheel speed detection means (wheel rotation information detection means) 1; a wheel speed calculation means for calculating wheel speeds based on the wheel rotation information detected by the wheel speed detection means 1; a determination value calculation means for calculating a decreased pressure determination value by a relative comparison of the wheel speeds calculated by the wheel speed calculation means; a determination means for determining, when the resultant decreased pressure determination value exceeds a predetermined threshold value, a tire having a decreased internal pressure; and a threshold value setting means for setting the predetermined threshold value based on a decreased pressure sensitivity calculated from a relation between a load sensitivity and a decreased pressure sensitivity during vehicle turning with regard to tires to be attached to the vehicle that is calculated in advance and a load sensitivity obtained through a turning running during initialization. A program for detecting a tire having a decreased internal pressure causes the control unit 2 to function as the wheel speed calculation means, the determination value calculation means, the determination means, and the threshold value setting means.

The threshold value of DEL for determining a decreased internal pressure can be determined, for example, based on how much the dynamic loaded radius of the tire reduces when the tire has a 25% or 30%-decreased pressure.

Specifically, when assuming that a DEL change amount DEL' when the tire pneumatic pressure decreases by 1% is a decreased pressure sensitivity, this decreased pressure sensitivity is proportional to the change rate β (=ΔDLR/DLR) of the dynamic loaded radius at a 1%–decreased pressure.

When a RR wheel has a 1%-decreased pressure for example and when the dynamic loaded radius of the RR wheel decreases by β from a dynamic loaded radius during a normal pressure, the wheel speed of the RR wheel increases by about β. Then, DEL' can be calculated by the following formula.

$$DEL'=2\times\{(V+V+\beta V)-(V+V)\}/(V+V+V+\beta V)$$

In the formula, V represents the wheel speed of the four wheels during a normal internal pressure.

Since β is a very small value and 4+β≈4 can be established, DEL'=β/2 can be established. As described above, the decreased pressure sensitivity is proportional to the change rate (β) of the dynamic loaded radius at a decreased pressure. The change rate (β) of the dynamic loaded radius at a decreased pressure has a proportional relation with the load sensitivity as described later. Thus, the decreased pressure sensitivity is also proportional to the load sensitivity.

It is known that the change rate of the dynamic loaded radius caused by a change of the internal pressure is substantially fixed for each tire and is substantially determined by the tire size. Thus, the threshold value of each tire can be determined by finding the information regarding a decreased pressure sensitivity in advance by experiments for example.

However, even when a vehicle under development actually has a fixed specification, the vehicle generally has a plurality of available tire sizes. Thus, even when a decreased pressure sensitivity of only one tire size among the tire sizes is found, there may be a case where tires having another size are attached to the vehicle and the threshold value is not compatible with the actual tires, thus failing to accurately detect a tire having a decreased internal pressure. In particular, when aspect ratios are significantly different as in a case where tires for which a decreased pressure sensitivity is known have an aspect ratio of 70 while tires actually attached to the vehicle have an aspect ratio of 50, the two types of tires also have significantly different decreased pressure sensitivities depending on a size. Thus, if a threshold value is determined based on the decreased pressure sensitivity of the tire having the aspect ratio of 70, it is impossible to accurately detect when the tire having the aspect ratio of 50 has a decreased internal pressure. This also applies to an opposite case (i.e., a case where tires actually attached to the vehicle have an aspect ratio significantly higher than the aspect ratio of tires for which decreased pressure sensitivity is known).

The present inventor has made various investigations in order to find a way to accurately detect a tire having a decreased internal pressure even without knowing in advance the decreased pressure sensitivities of all tires, thus reaching a method of setting a threshold value in consideration of an influence by a decreased pressure sensitivity depending on a difference of the size. Specifically, the present inventor has achieved the present invention based on the finding that the decreased pressure sensitivity has a proportional relation with a load sensitivity that is a change amount of a dynamic loaded radius to a load and using the phenomenon in which a load shift occurs in the left and right wheels in any vehicle during turning running.

More particularly, since a decreased pressure sensitivity has a proportional relation with a load sensitivity, if only the proportional constant of the decreased pressure sensitivity and the load sensitivity is known in advance by an experiment, a decreased pressure sensitivity can be automatically calculated based on the load sensitivity, thus calculating a threshold value depending on tires actually attached to the vehicle. The load sensitivity can be calculated, as described later, based on a relational expression between a ratio of the dynamic loaded radius change due to the load shift during turning to the dynamic loaded radius (dynamic loaded radius change/dynamic loaded radius), the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

An experiment to obtain the relation between the decreased pressure sensitivity and the load sensitivity is not required to be performed with all sizes and patterns of tires to be attached to the vehicle. Since the decreased pressure sensitivity has a fixed proportional relation with the load sensitivity, at least one or desirably about three representative tires having different sizes may be measured to only calculate a proportional constant.

It is considered that the change rate (β) of the dynamic loaded radius at a decreased pressure is proportional to the load sensitivity due to the following reason.

The tire dynamic loaded radius is mainly determined by the circumferential length of a tire breaker and changes by the deflection of the tire breaker due to a load acting on the tire or a decrease of a tire internal pressure. This deflection amount is proportional to the tire ground contact area. A large ground contact area corresponds to a high deflection amount. Here, the ground contact area S has the following relation.

Ground contact area S∝load/internal pressure

In other words, the following relation (2) is established.

Change of dynamic loaded radius=Change of deflection amount∝ground contact area S∝load/internal pressure (2)

As can be seen from the relation shown by the above formula (2), an increase of the load to a change of the dynamic loaded radius is equivalent to a decrease of the internal pressure. Thus, an influence by the internal pressure on the dynamic loaded radius can be substituted with an influence by the load.

[Method for Detecting Decreased Internal Pressure]

The following section will describe a detection method according to First Embodiment of the present invention.

(1) First, based on an output signal (pulse signal) from the wheel speed detection means 1, the angular velocities (ω) of the respective tires are calculated based on the following formula (3).

Angular velocity (ω)=2π×Freq(Hz)/N(number of teeth) (3)

In the formula, N represents the number of teeth per one rotation of the vehicle axis of the wheel speed detection means 1. Freq(Hz) represents a value obtained by counting the teeth of the wheel speed detection means 1 per one second.

The tire dynamic loaded radius also changes depending on factors other than a decreased internal pressure of a tire such as acceleration and deceleration, turning, or ramp running. Thus, it is preferable that the vehicle running status is limited (or limited to a running status where the vehicle is running straight on a flat road with a fixed speed) so that data obtained in the limited status as described above is used as effective data. This limitation can exclude a change of the tire dynamic loaded radius due to other factors than a decreased internal pressure of a tire from the data for determining a decreased internal pressure to thereby determine a decreased internal pressure accurately.

Specifically, a running condition is compared with the respective determination conditions to determine whether the running condition satisfies conditions for a fixed speed running, a flat road running, and straight running or not. Then, it is determined whether data obtained through an actual running is data suitable for calculating a determination value or not. When the data is inappropriate data, the data is not used as data for calculating a determination value and is excluded. Determination conditions may be, for example, a vehicle front-and-rear direction |G|<0.05 G, an orientation change of 1 degree or less, a road surface pitch of 5% or less, and no braking.

(2) Next, DEL for determining a decreased pressure is calculated based on the formula (1) for example. The DEL can be accumulated in a predetermined number and the average value thereof can be used to determine a tire having a decreased internal pressure. In this case, the use of the average value can improve the determination accuracy. Alternatively, the variation of DELs accumulated in a predetermined number also can be determined by population variance so that a DEL average value is calculated when a variation value ($\sigma^2$) is smaller than a criterion value.

(3) Next, the calculated DEL is compared with a predetermined threshold value. When the DEL is higher than this threshold value, a decreased tire internal pressure is determined. Then, the display unit 3 displays the decreased pressure and the alarm unit 5 issues an alarm to the driver.

[Method of Setting Threshold Value]

In order to set a threshold value, an actual vehicle experiment (calibration) is firstly carried out as the first stage to thereby calculate a relational expression between a load sensitivity and a decreased pressure sensitivity. Then, a constant for calculating the decreased pressure sensitivity based on the load sensitivity is determined and is stored in a storage means. In the second stage, the load sensitivity is estimated during turning running in the initialization of an actual running. The estimated load sensitivity is multiplied with the stored proportional constant to thereby automatically set a decreased pressure threshold value in the initialization stage.

The following section will describe in detail a method of setting the threshold value.

[Calibration]

In the first stage, a relation between a decreased pressure sensitivity and a load sensitivity is calculated by performing an actual vehicle experiment (calibration) in advance. In the experiment performed in advance, the turning running is performed with tires of various sizes (and using the same type of tires for four wheels in the respective experiments) to thereby calculate the load sensitivity. Then, a tire pressure is decreased to an internal pressure at which a decreased pressure alarm is issued (e.g., a value such as a 25%-decreased pressure. This value can be changed). Then, a dynamic loaded radius change ratio (change amount of the dynamic loaded radius/dynamic loaded radius) at the decreased internal pressure is calculated. Then, a proportional constant between the decreased pressure sensitivity and the load sensitivity that is proportional to the dynamic loaded radius change ratio is calculated. The value of the proportional constant is stored in the storage means in advance.

This experiment performed in advance for the relation between the decreased pressure sensitivity and the load sensitivity is not required to be performed for all sizes and patterns of tires to be attached to the vehicle because the decreased pressure sensitivity has a proportional relation with the load sensitivity as described above. Thus, one tire at the minimum or desirably about three representative tires having different sizes may be measured to calculate the proportional constant.

The present invention is characterized in using a fact that a load shifts between left and right wheels during vehicle turning to thereby calculate a load sensitivity based on the change amount of the dynamic loaded radius due to the load shift. Since a load shift occurs between left and right wheels during turning running for any type of vehicles, the load sensitivity can be calculated regardless of vehicle types.

The following section will describe a relation between a change of the dynamic loaded radius and the load shift amount with regard to left and right driven wheels when a front-wheel drive vehicle is performing a turning running.

Figure 3:
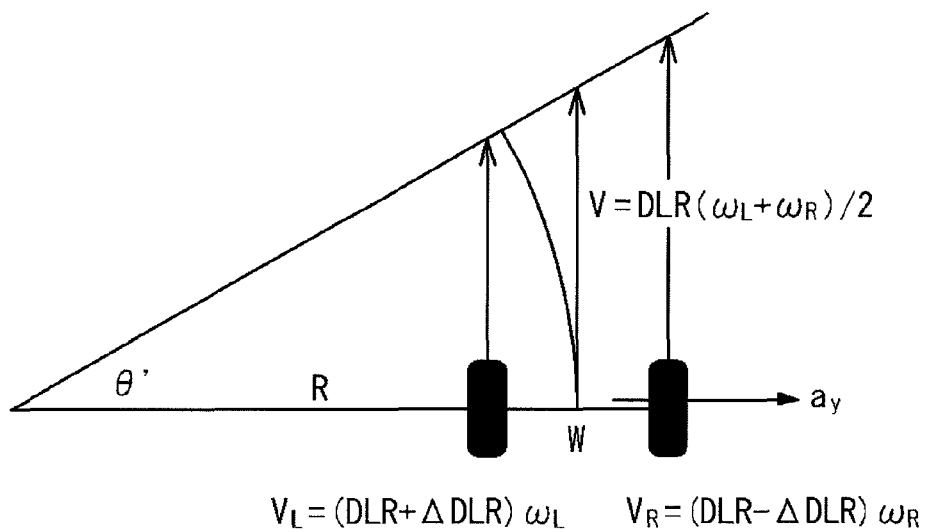
FIG. 3 illustrates the relation between the ground speeds of inner and outer wheels (left and right driven wheels) and the vehicle speed during left turning.

First, as shown in FIG. 3, a status is assumed where the vehicle is turning left on a circle having a radius R. The vehicle includes therein a yaw rate sensor for detecting a yaw rate ($\theta'$) and a lateral acceleration sensor for detecting a lateral acceleration ($a_y$). The respective detection signals are sent to the control unit 2.

The relation between each sensor value and the turning radius R can be represented by the following formula (4) since $\theta'=V/R$ and $a_y=V^2/R$ are satisfied.

$$\frac{1}{R} = \frac{\theta'^2}{a_y} \quad (4)$$

When assuming that the outer wheel (right wheel) has a ground speed $V_R$, the inner wheel (left wheel) has a ground speed $V_L$, and a tread width is W, the following formulae are established.

$$(R+W/2) \times \theta' = V_R$$

$$(R-W/2) \times \theta' = V_L$$

Thus, the yaw rate ($\theta'$) is represented by the following formula (5). The vehicle speed (V) is represented by the following formula (6).

$$\theta' = \frac{(V_R - V_L)}{W} \quad (5)$$

$$V = (V_R + V_L)/2 \quad (6)$$

Then, based on the formula (5) and the formula (6), the formula (7) can be obtained in the manner as described below. The ground speeds $V_L$ and $V_R$ are represented as follows based on the wheel speed ($\omega$) and the dynamic loaded radius (DLR).

$$V_L = (DLR + \Delta DLR) \times \omega_L$$

$$V_R = (DLR - \Delta DLR) \times \omega_R$$

The sum ($V_R + V_L$) of the ground speeds $V_L$ and $V_R$ can be calculated as follows.

$$V_R + V_L = (DLR + \Delta DLR) \times \omega_L + (DLR - \Delta DLR) \times \omega_R$$

$$= DLR(\omega_R + \omega_L) - \Delta DLR(\omega_R - \omega_L)$$

Since $\Delta DLR(\omega_R - \omega_L) \approx 0$ is established, $V_R + V_L \approx DLR(\omega_R + \omega_L)$ can be established.

$$1/R = \theta'/V \tag{7}$$

$$= \frac{(V_R - V_L)/W}{(V_R + V_L)/2}$$

$$= \frac{2}{W} \frac{(DLR - \Delta DLR)\omega_R - (DLR + \Delta DLR)\omega_L}{DLR(\omega_R + \omega_L)}$$

$$= \frac{2}{W} \frac{DLR(\omega_R - \omega_L) - \Delta DLR(\omega_R + \omega_L)}{DLR(\omega_R + \omega_L)}$$

$$= \frac{2}{W}\left(\left(\frac{(\omega_R - \omega_L)}{(\omega_R + \omega_L)}\right) - \frac{\Delta DLR}{DLR}\right)$$

Based on the formula (4) and the formula (7), the following formula (8) can be obtained.

$$\frac{\theta'^2}{a_y} = \frac{2}{W}\left(\left(\frac{(\omega_R - \omega_L)}{(\omega_R + \omega_L)}\right) - \frac{\Delta DLR}{DLR}\right) \tag{8}$$

$$\therefore \frac{\Delta DLR}{DLR} = \left(\frac{(\omega_R - \omega_L)}{(\omega_R + \omega_L)}\right) - \frac{\theta'^2}{a_y} \cdot \frac{W}{2}$$

Figure 4:
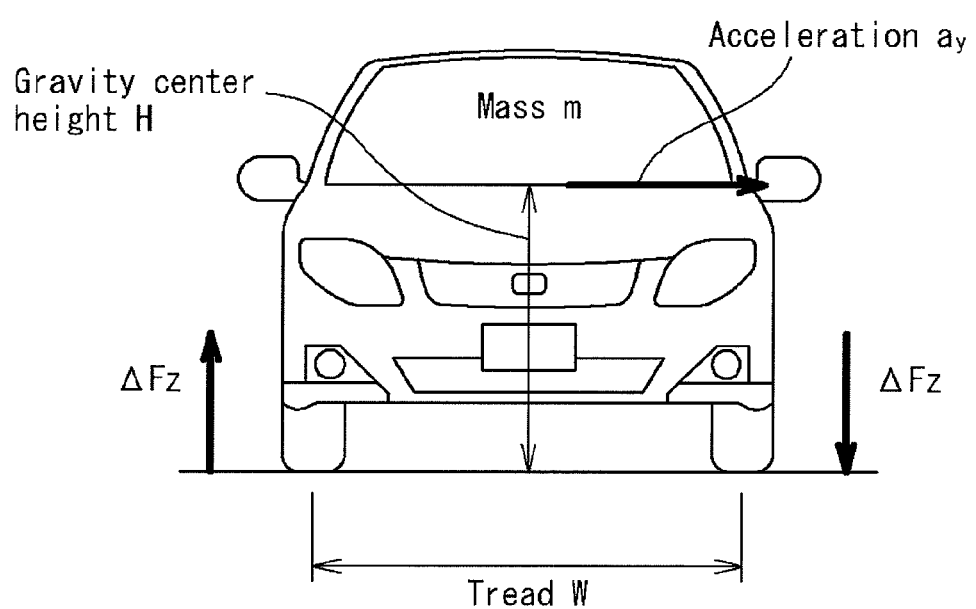
FIG. 4 illustrates various vehicle parameters.

In the formula (8), ($\Delta DLR/DLR$) is proportional to the load shift amount ($\Delta Fz$, see FIG. 4). When assuming that the load sensitivity is b and the load shift share rate of the driven wheel axis to all axes is $\alpha$ ($0<\alpha<1$), ($\Delta DLR/DLR$) is represented by the following formula (9).

$$\frac{\Delta DLR}{DLR} = b \cdot (\alpha \cdot \Delta Fz) = \left[b \cdot \alpha\left(\frac{H}{W}\right)m\right] \cdot a_y \tag{9}$$

The load shift share rate $\alpha$, the vehicle gravity center height (H), the tread width (W), and the mass (m) are basically determined uniquely in the case of the same vehicle. Thus, the coefficient of $a_y$ (lateral acceleration) increases when the tire has a higher load sensitivity b.

[Initialization]

The initialization of a detection apparatus is performed by operating the initialization button 4 after exchanging tires with new tires and adjusting the tires to have a predetermined internal pressure for example. During the turning running in the initialization, the load sensitivity is estimated as in the calibration. Then, the estimated load sensitivity is multiplied with the proportional constant to the decreased pressure sensitivity stored in advance in the storage means to thereby automatically set a decreased pressure threshold value in the initialization stage. The set decreased pressure threshold value is similarly stored in the storage means.

[Second Embodiment]

In Second Embodiment, the load sensitivity is estimated by the comparison between change amounts of the dynamic loaded radii of left and right driven wheels during vehicle turning that are obtained from the wheel speeds and change amounts of the dynamic loaded radii of left and right driving wheels during vehicle turning that are obtained from wheel speeds. Thus, Second Embodiment is different from First Embodiment in that the detection apparatus does not include therein a yaw rate sensor for detecting a yaw rate and a lateral acceleration sensor for detecting a lateral acceleration.

In the detection method according to Second Embodiment, the load sensitivity is estimated by the comparison between the change amounts of the dynamic loaded radii of left and right driven wheels during vehicle turning that are obtained from the wheel speeds and the change amounts of the dynamic loaded radii of left and right driving wheels during vehicle turning that are obtained from wheel speeds.

Furthermore, in the detection apparatus according to Second Embodiment, the threshold value setting means is configured to estimate the load sensitivity by the comparison between the change amounts of the dynamic loaded radii of left and right driven wheels during vehicle turning that are obtained from the wheel speeds and the change amounts of the dynamic loaded radii of left and right driving wheels during vehicle turning that are obtained from wheel speeds.

In the present embodiment, the load sensitivity can be calculated, as described later, by the comparison between the change amounts of the dynamic loaded radii of the left and right driven wheels and the change amounts of the dynamic loaded radii of the left and right driving wheels during vehicle turning running. The change amounts of the dynamic loaded radii of the left and right driven wheels and the change amounts of the dynamic loaded radii of the left and right driving wheels can be obtained only from wheel speeds calculated based on the wheel rotation information of tires attached to the vehicle. Specifically, this calculation does not require a GPS apparatus or a sensor (e.g., a yaw rate sensor or a lateral acceleration sensor), thus providing a simpler configuration to the detection apparatus.

In the present embodiment, the change amounts of the dynamic loaded radii can be calculated only from the wheel speed. Thus, the threshold value can be easily set even for a vehicle not including a GPS apparatus or a special sensor (e.g., a yaw rate sensor or a lateral acceleration sensor).

In the present embodiment, the load sensitivity is estimated by using the fact that the load shift amount during turning is generally different between a driven wheel and a driving wheel. Specifically, since the load shift amount during turning is different between a driven wheel and a driving wheel, the change amount of the dynamic loaded radius during turning is also different between a driven wheel and a driving wheel. Since the relative comparison can be carried out between the change amounts of the dynamic loaded radii of the left and right driven wheels (wheel speed change amounts) and the change amounts of the dynamic loaded radii of the left and right driving wheels (wheel speed change amounts), this can be used to estimate the load sensitivity.

<Left and Right Driven Wheels>

Next, the following section will describe the relation between the dynamic loaded radius changes of the left and right driven wheels and the load shift amounts when a front-wheel drive vehicle is performing a turning running.

First, as shown in FIG. 3, a case is assumed where the vehicle is turning left on a circle having a radius (R) with a yaw rate ($\theta'$) and a speed (V). In this case, the turning radius (R), the yaw rate ($\theta'$), and the speed (V) have thereamong a relation represented by the following formula (10).

$$\theta' = V/R \tag{10}$$

When assuming that the outer wheel (right wheel) has a ground speed $V_R$, the inner wheel (left wheel) has a ground speed $V_L$, and a tread width is W, the following formulae are established.

$$(R + W/2) \times \theta' = V_R$$

$$(R - W/2) \times \theta' = V_L$$

Thus, the yaw rate ($\theta'$) is represented by the following formula (11). The vehicle speed (V) is represented by the following formula (12).

$$\theta' = \frac{(V_R - V_L)}{W} \quad (11)$$

$$V = (V_R + V_L) \quad (12)$$

Then, based on the formulae (11) and (12), the formula (13) can be obtained in the manner as described below. Here, the ground speeds $V_L$ and $V_R$ are represented as shown below based on the wheel speed ($\omega$) and the dynamic loaded radius (DLR).

$$V_L = (DLR + \Delta DLR) \times \omega_L$$

$$V_R = (DLR - \Delta DLR) \times \omega_R$$

In the formulae, the sum $(V_R + V_L)$ of the ground speeds $V_L$ and $V_R$ is represented as follows.

$$V_R + V_L = (DLR + \Delta DLR) \times \omega_L + (DLR - \Delta DLR) \times \omega_R = DLR(\omega_R + \omega_L) - \Delta DLR(\omega_R - \omega_L)$$

However, since $\Delta DLR(\omega_R - \omega_L) \approx 0$ is established, $V_R + V_L \approx DLR(\omega_R + \omega_L)$ can be established.

$$\begin{aligned}
1/R &= \theta'/V \\
&= \frac{(V_R - V_L)/W}{(V_R + V_L)/2} \\
&= \frac{2}{W} \frac{(DLR - \Delta DLR)\omega_R - (DLR + \Delta DLR)\omega_L}{DLR(\omega_R + \omega_L)} \\
&= \frac{2}{W} \frac{DLR(\omega_R - \omega_L) - \Delta DLR(\omega_R + \omega_L)}{DLR(\omega_R + \omega_L)} \\
&= \frac{2}{W} \left( \frac{(\omega_R - \omega_L)}{(\omega_R + \omega_L)} - \frac{\Delta DLR}{DLR} \right)
\end{aligned} \quad (13)$$

Based on the formula (13), the following formula (14) can be obtained.

$$\frac{\Delta DLR}{DLR} = \left( \frac{(\omega_R - \omega_L)}{(\omega_R + \omega_L)} \right) - \frac{W}{2} \cdot \frac{1}{R} \quad (14)$$

In the formula (14), ($\Delta DLR/DLR$) is proportional to the load shift amount ($\Delta Fz$, see FIG. 4). When assuming that the load sensitivity is b and the load shift share rate of the driven wheel axis to all axes is $\alpha$ ($0 < \alpha < 1$), ($\Delta DLR/DLR$) is represented by the following formula (15).

$$\frac{\Delta DLR}{DLR} = b \cdot (\alpha \cdot \Delta Fz) = \left[ b \cdot \alpha \left( \frac{H}{W} \right) m \right] \cdot a_y \quad (15)$$

The load shift share rate $\alpha$, the vehicle gravity center height (H), the tread width (W), and the mass (m) are basically determined uniquely in the case of the same vehicle. Thus, the coefficient of $a_y$ (lateral acceleration) increases when the tire has a higher load sensitivity b.

<Left and Right Driving Wheels>

The following section will describe the relation between the dynamic loaded radius changes of the left and right driving wheels and the load shift amount when a front-wheel drive vehicle is performing a turning running.

Figure 8:
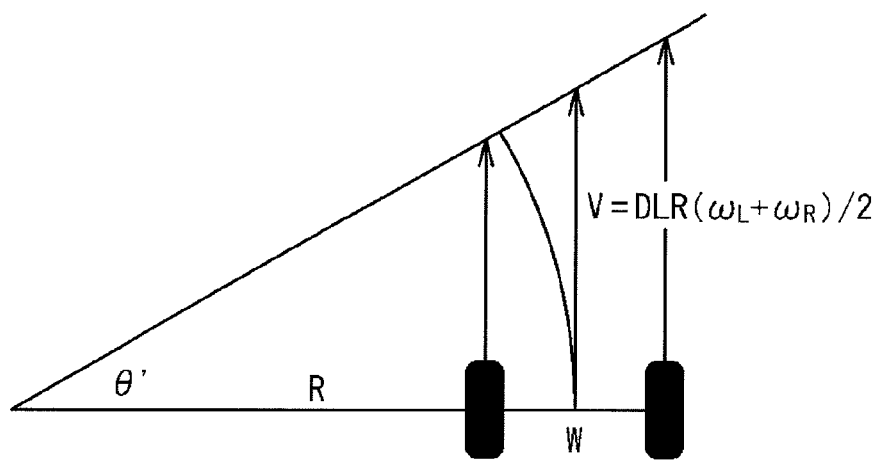
FIG. 8 illustrates the relation between the ground speeds of left and right driving wheels and the vehicle speed during left turning.

As in the case of a driven wheel (FIG. 3), as shown in FIG. 8, a status is assumed where the vehicle is turning left on a circle having the radius (R). In the case of driving wheels, slipping occurs due to a driving force, so that the influence thereof must be considered. Another factor also must be considered that an increased ground contact area of an outer wheel during turning running causes the outer wheel to have a lower slip rate than the slip rate of an inner wheel.

The driving force (Fx) and the slip rates of left and right wheels during turning ($s+\Delta s$, $s-\Delta s$) satisfy the relation represented by the following formula (16) when assuming that the driving stiffnesses are $D_L$ and $D_R$.

$$Fx = D_L \cdot (s + \Delta s) + D_R \cdot (s - \Delta s) \quad (16)$$

Since the driving force is evenly allocated to left and right by the vehicle differential, the following formula can be established.

$$D_L \cdot (s + \Delta s) = D_R \cdot (s - \Delta s) \quad (17)$$

Here, the left and right wheels basically have the same tires. Thus, $D_L$ and $D_R$ can be represented by the following formulae when assuming that an attached tire has a driving stiffness G per a unit area, the ground contact area in the case of a standard load is A, and the change amount of the ground contact area that decreases or increases due to a load shift during turning is $\Delta A$.

$$D_L = G(A - \Delta A) \quad (17)'$$

$$D_R = G(A + \Delta A) \quad (17)''$$

Furthermore, the ground contact area (A) and the change amount ($\Delta A$) have a relation with the standard load (Fz) and the load shift amount ($\Delta Fz$) satisfying the following formula (18).

$$\Delta A/A = \Delta Fz/Fz \quad (18)$$

Specifically, the slip rate and the load can be calculated based on the formulae (17), (17)', and (17)''.

$$\frac{D_L}{D_R} = \frac{A - \Delta A}{A + \Delta A} = \frac{s - \Delta s}{s + \Delta s}$$

Furthermore, the following can be established based on the formula (18).

$$= \frac{Fz - \Delta Fz}{Fz + \Delta Fz} = \frac{s - \Delta s}{s + \Delta s}$$

Thus, the relation shown in the following formula can be satisfied.

$$\Delta s = \frac{\Delta Fz}{Fz} s$$

As in the case of a driven wheel, the relation between 1/R and the wheel speed can be represented by the following formula.

$$\frac{1}{R} = \left( \frac{2}{W} \right) \left( \frac{V_R - V_L}{V_R + V_L} \right)$$

Since $V_L = (1-(s+\Delta s))(DLR+\Delta DLR)\omega_L$ and $V_R = (1-(s-\Delta s))(DLR-\Delta DLR)\omega_R$ are established, the following formula can be established.

$$\left(\frac{W}{2}\right)\frac{1}{R} = \frac{(1-s)DLR(\omega_R - \omega_L) - (1-s)\Delta DLR(\omega_R + \omega_L) +}{(1-s)DLR(\omega_R + \omega_L) - \Delta s \cdot \Delta DLR(\omega_R - \omega_L)}{(1-s)DLR(\omega_R + \omega_L) - (1-s)\Delta DLR(\omega_R - \omega_L) +}{\Delta s \cdot DLR(\omega_R - \omega_L) - \Delta s \cdot \Delta DLR(\omega_R + \omega_L)}$$

In the formula, it can be assumed that $\Delta s \cdot \Delta DLR$, $\Delta DLR$ ($\omega_R - \omega_L$) and $\Delta s \cdot (\omega_R - \omega_L)$ in the right side can be assumed as substantially zero. Thus, the following formula can be established.

$$\left(\frac{W}{2}\right)\frac{1}{R} = \frac{(\omega_R - \omega_L)}{(\omega_R + \omega_L)} - \frac{\Delta DLR}{DLR} + \frac{\Delta s}{1-s}$$

$$= \frac{(\omega_R - \omega_L)}{(\omega_R + \omega_L)} - \frac{\Delta DLR}{DLR} + \frac{\Delta Fz}{Fz}\frac{s}{1-s}$$

When it can be assumed that the driving force is not so high and s is low ($s/(1-s) \approx s$), the following formula can be established.

$$\left(\frac{W}{2}\right)\frac{1}{R} = \frac{(\omega_R - \omega_L)}{(\omega_R + \omega_L)} - \frac{\Delta DLR}{DLR} + \frac{\Delta Fz}{Fz}s$$

<Relation Between Driven Wheel and Driving Wheel>

When the vehicle is turning on the radius R, the following formula can be established based on the relation of the respective turning radii of the driven wheel (idler) and the driving wheel (drive).

$$\left(\frac{W}{2}\right)\frac{1}{R} = \left[\frac{(\omega_R - \omega_L)}{(\omega_R + \omega_L)}\right]_{drive} - \left[\frac{\Delta DLR}{DLR}\right]_{drive} + \frac{\Delta Fz}{Fz}s$$

$$= \left[\frac{(\omega_R - \omega_L)}{(\omega_R + \omega_L)}\right]_{idler} - \left[\frac{\Delta DLR}{DLR}\right]_{idler}$$

The above formula can be modified to the following formula (19).

$$\left[\frac{(\omega_R - \omega_L)}{(\omega_R + \omega_L)}\right]_{drive} - \left[\frac{(\omega_R - \omega_L)}{(\omega_R + \omega_L)}\right]_{idler} = \qquad (19)$$

$$\left[\frac{\Delta DLR}{DLR}\right]_{drive} - \left[\frac{\Delta DLR}{DLR}\right]_{idler} - \frac{\Delta Fz}{Fz}s$$

Here, $\Delta Fz$ and s can be represented by the following formulae when assuming that the lateral acceleration is $a_y$, the front-and-rear acceleration is $a_x$, and the driving stiffness is D.

$$\Delta Fz = \left(\frac{H}{W}\right)m \cdot a_y$$

$$s = \frac{m}{D}a_x$$

The following formulae also can be established (the share rate of the driven wheel axis is assumed as $\alpha$ with regard to the load shift during turning).

$$\left[\frac{\Delta DLR}{DLR}\right]_{idler} = b \cdot (\alpha \cdot \Delta Fz) = \left[b \cdot \alpha\left(\frac{H}{W}\right)m\right] \cdot a_y$$

$$\left[\frac{\Delta DLR}{DLR}\right]_{drive} = b \cdot \{(1-\alpha) \cdot \Delta Fz\} = \left[b \cdot (1-\alpha)\left(\frac{H}{W}\right)m\right] \cdot a_y$$

When these relations are substituted to the formula (19), the following formula can be obtained.

$$\left[\frac{(\omega_R - \omega_L)}{(\omega_R + \omega_L)}\right]_{drive} - \left[\frac{(\omega_R - \omega_L)}{(\omega_R + \omega_L)}\right]_{idler} = \qquad (20)$$

$$(1 - 2\alpha) \cdot b\left(\frac{H}{W}\right)m \cdot a_y - \frac{1}{Fz}\left(\frac{H}{W}\right)m\left(\frac{m}{D}\right)(a_y \cdot a_x)$$

Furthermore, the front-and-rear acceleration $a_x$ can be represented by the following formula.

$$a_x = \frac{V_t - V_{t-1}}{\Delta t} = \frac{DLR \cdot \{(\omega_R + \omega_L)_t - (\omega_R + \omega_L)_{t-1}\}}{2 \cdot \Delta t}$$

The lateral acceleration $a_y$ can be represented by the following formula.

$$a_y = V\theta' = \left(\frac{V_R + V_L}{2}\right)\left(\frac{V_R - V_L}{W}\right)$$

$$= \left(\frac{DLR(\omega_R + \omega_L)}{2}\right) \cdot \left(\frac{DLR(\omega_R - \omega_L) - \Delta DLR(\omega_R + \omega_L)}{W}\right)$$

$$= \left(\frac{DLR(\omega_R + \omega_L)}{2}\right) \cdot \left(\frac{DLR\{(\omega_R - \omega_L) - \left[b \cdot \alpha\left(\frac{H}{W}\right)m\right] \cdot a_y(\omega_R + \omega_L)\}}{W}\right)$$

$$= \frac{DLR^2(\omega_R + \omega_L)(\omega_R - \omega_L) - DLR(\omega_R + \omega_L)\left[b \cdot \alpha\left(\frac{H}{W}\right)m\right](\omega_R + \omega_L)a_y}{2W}$$

Thus, the following formula is established.

$$a_y = \frac{DLR^2(\omega_R + \omega_L)(\omega_R - \omega_L)}{2W + DLR\left[b \cdot \alpha\left(\frac{H}{W}\right)m\right](\omega_R + \omega_L)^2}$$

When these $a_x$ and $a_Y$ are substituted in the formula (20), the following formula is established.

$$\left[\frac{(\omega_R - \omega_L)}{(\omega_R + \omega_L)}\right]_{drive} - \left[\frac{(\omega_R - \omega_L)}{(\omega_R + \omega_L)}\right]_{idler} =$$

$$(1 - 2\alpha) \cdot b\left(\frac{H}{W}\right)m \cdot \frac{DLR^2(\omega_R + \omega_L)(\omega_R - \omega_L)}{2W + DLR\left[b \cdot \alpha\left(\frac{H}{W}\right)m\right](\omega_R + \omega_L)^2} -$$

$$\frac{1}{Fz}\left(\frac{H}{W}\right)m\left(\frac{m}{D}\right)\left(\frac{DLR^2(\omega_R + \omega_L)(\omega_R - \omega_L)}{2W + DLR\left[b \cdot \alpha\left(\frac{H}{W}\right)m\right](\omega_R + \omega_L)^2} \cdot\right.$$

$$\left.\frac{DLR\{(\omega_R + \omega_L)_t - (\omega_R + \omega_L)_{t-1}\}}{2 \cdot \Delta t}\right)$$

$$\left(2W + DLR\left[b \cdot \alpha\left(\frac{H}{W}\right)m\right](\omega_R + \omega_L)^2\right)$$

-continued $$\left(\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\right)=$$

$$(1-2\alpha)\cdot b\left(\frac{H}{W}\right)mDLR^2(\omega_R+\omega_L)(\omega_R-\omega_L)-$$

$$\frac{1}{Fz}\left(\frac{H}{W}\right)m\left(\frac{m}{D}\right)\frac{DLR^3}{2}\left(\frac{(\omega_R+\omega_L)_t-(\omega_R+\omega_L)_{t-1}}{\Delta t}\right)(\omega_R+\omega_L)$$

$$(\omega_R+\omega_L)$$

The left side is established as follows.

$$2W\left(\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\right)+$$

$$DLR\left[b\cdot\alpha\left(\frac{H}{W}\right)m\right](\omega_R+\omega_L)^2\left(\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\right)$$

Thus, the following formula is established.

$$\left[\frac{(\omega_R-\omega_L)}{(\omega_R+\omega_L)}\right]_{drive}-\left[\frac{(\omega_R-\omega_L)}{(\omega_R+\omega_L)}\right]_{idler}=\frac{1}{2W}$$

$$\left(-DLR\left[b\cdot\alpha\left(\frac{H}{W}\right)m\right](\omega_R+\omega_L)^2\left(\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\right)+\right.$$

$$(1-2\alpha)\cdot b\left(\frac{H}{W}\right)mDLR^2(\omega_R+\omega_L)(\omega_R+\omega_L)-\frac{1}{Fz}\left(\frac{H}{W}\right)m\left(\frac{m}{D}\right)$$

$$\left.\frac{DLR^3}{2}\left(\frac{(\omega_R+\omega_L)_t+(\omega_R+\omega_L)_{t-1}}{\Delta t}\right)(\omega_R+\omega_L)(\omega_R-\omega_L)\right)$$

In the formula, factors other than the load sensitivity b and the wheel speed (ωR, ωL) are constants uniquely determined with regard to a predetermined vehicle.
The following formula is assumed.

$$\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\equiv Y$$

$$(\omega_R+\omega_L)^2\left(\left[\frac{(\omega_R-\omega_L)}{(\omega_R+\omega_L)}\right]_{drive}-\left[\frac{(\omega_R-\omega_L)}{(\omega_R+\omega_L)}\right]_{idler}\right)\equiv X_1$$

$$(\omega_R+\omega_L)(\omega_R-\omega_L)\equiv X_2$$

$$\left(\frac{(\omega_R+\omega_L)_t+(\omega_R+\omega_L)_{t-1}}{\Delta t}\right)(\omega_R+\omega_L)(\omega_R-\omega_L)\equiv X_3$$

Then, the following formula is established.

$$Y=AX_1+BX_2+CX_3 \quad (21)$$

These Y, $X_1$, $X_2$, and $X_3$ can be calculated based on the wheel speed. Thus, by calculating a regression coefficient by the above formula, A and B can be identified because A and B are different depending on the tire load sensitivity.

[Initialization]

The initialization of a detection apparatus is performed by operating the initialization button 4 after exchanging tires with new tires to subsequently adjust the new tires to have a predetermined internal pressure. During this initialization, the load sensitivity is estimated as in the calibration during turning running. Then, the estimated load sensitivity is multiplied with the proportional constant to the decreased pressure sensitivity stored in advance in the storage means to thereby automatically set a decreased pressure threshold value in the initialization stage. The decreased pressure threshold value is also stored in the storage means.

EXAMPLE

The following section will describe examples of the detection method of the present invention. However, the present invention is not limited to such examples only.

Example 1

In order to obtain the angular velocities of the respective tires attached to a vehicle, rotation speed information used for ABS control was converted to the angular velocities. In order to obtain a lateral acceleration and a yaw rate of the vehicle, sensors were attached to predetermined positions of the vehicle. The lateral acceleration and the yaw rate were directly outputted to a PC as serial data and the data is synchronized at every 50 msec as digital data and is taken into the PC.

An experiment was performed on a FF vehicle with a criterion internal pressure of 200 kPa. Three types of tires (see Table 1) were used in calibration.

Calibration

The three types of tires shown in Table 1 were sequentially attached to a FF vehicle. Then, the vehicle was subjected to calibration in the Okayama test course of Sumitomo Rubber Industries, Ltd. to thereby calculate load sensitivities and decreased pressure sensitivities.

Figure 5:
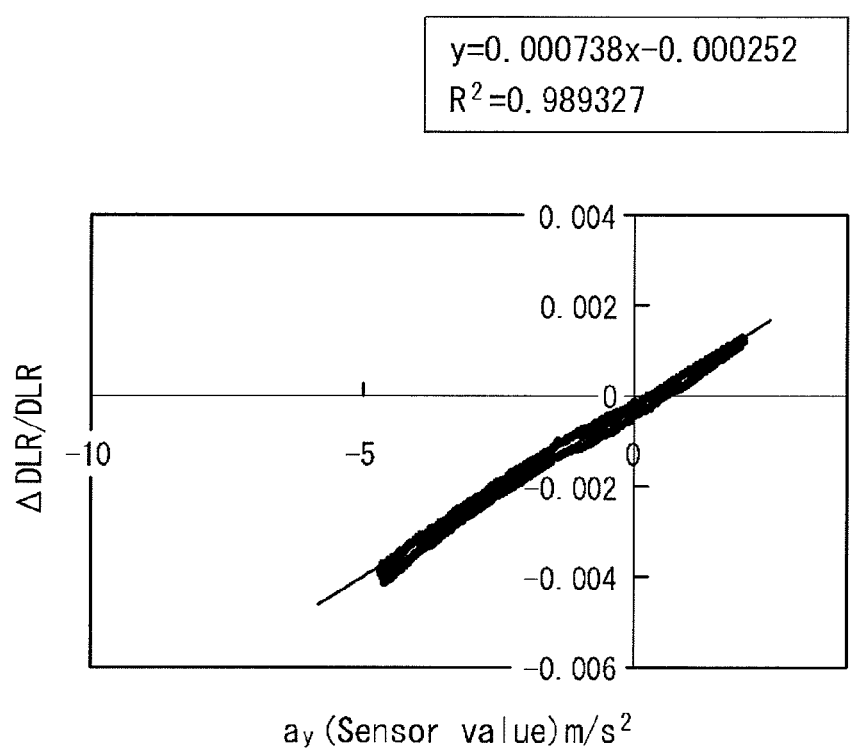
FIG. 5 is a diagram plotting the $\Delta DLR/DLR$ and the lateral acceleration $a_y$ with regard to the tire size 185/70R14.

The load sensitivity was calculated based on the formula (9) to thereby calculate the inclination of an approximate line (coefficient=b×α×(H/W)×m) as shown in FIG. 5 (where ΔDLR/DLR obtained by the formula (8) is taken by the vertical axis and the lateral acceleration $a_y$ is taken by the lateral axis). The inclination can be calculated on-line by using the iterative least squares technique for example. Since the coefficient changes only depending on the load sensitivity b, the coefficient was used as a representative characteristic value of the load sensitivity. The term "load sensitivity" herein means to include not only a mere load sensitivity but also a value which changes depending only on the load sensitivity (a parameter consisting of a load sensitivity and a value uniquely determined in the vehicle).

FIG. 5 is a diagram plotting, with regard to the tire size 185/70R14, the ratio between the dynamic loaded radius change ΔDLR and the dynamic loaded radius DLR (ΔDLR/DLR) and the lateral acceleration $a_y$ obtained from the lateral acceleration sensor. The coefficient showing the inclination of the straight line approximating the relation of ΔDLR/DLR and $a_y$ was 0.00074. The coefficient was similarly calculated with regard to the tire sizes 195/60R15 and 205/50R16.

On the other hand, the decreased pressure sensitivity was calculated by actually decreasing the tire pressure by a predetermined amount (e.g., 25%) to calculate a value, i.e., a decreased pressure sensitivity, by dividing the resultant ΔDEL by the decreased pressure represented by %, the result of which is shown in Table 1.

TABLE 1

| Size | $\left[b\cdot\alpha\frac{H}{W}\cdot m\right]$ $(1/(m/s)^2)$ | Decreased pressure sensitivity (1/decreased pressure %) |
|---|---|---|
| 185/70R14 | 0.00074 | 0.000100 |
| 195/60R15 | 0.00092 | 0.000133 |
| 205/50R16 | 0.00110 | 0.000160 |

Figure 6:
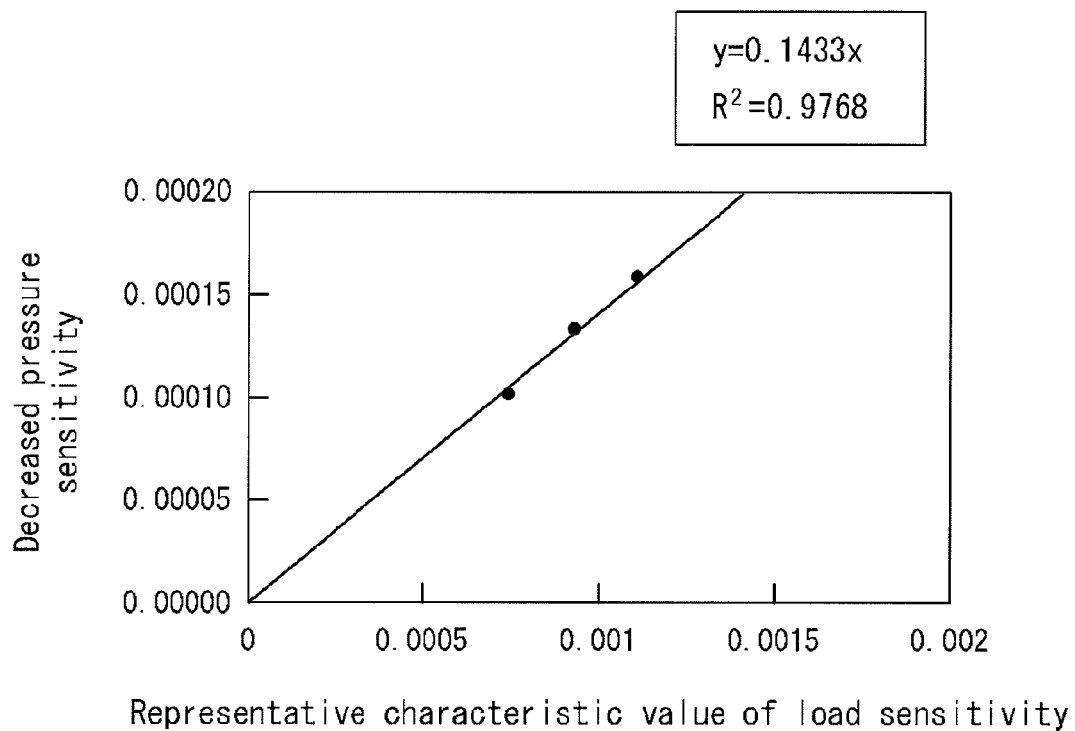
FIG. 6 illustrates the relation between the decreased pressure sensitivity and the representative characteristic value of a load sensitivity.

Based on the above calibration result, proportional constant between the representative characteristic value of a load sensitivity and decreased pressure sensitivities was calculated as shown in FIG. 6 and the calculated value (0.1433) was preset in the storage means.

Setting of Threshold Value

Figure 7:
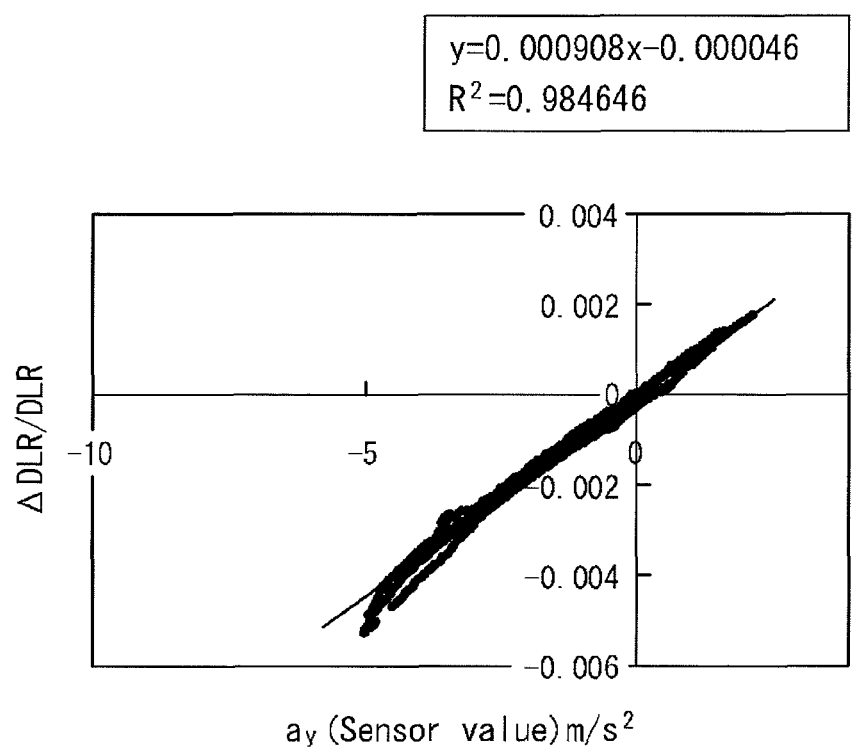
FIG. 7 is a diagram plotting the $\Delta DLR/DLR$ and the lateral acceleration $a_y$ with regard to a certain tire.

Certain tires T were attached to the FF vehicle. Then, in the turning running of the initialization, ΔDLR/DLR was calculated as described above. Then, the inclination of the approximate line showing the relation between the ΔDLR/DLR and the lateral acceleration obtained from the lateral acceleration sensor was calculated (see FIG. 7).

The resultant coefficient (0.000908) was multiplied with the proportional constant to the decreased pressure sensitivity (0.1433) that was calculated in advance by calibration to obtain a decreased pressure sensitivity. When the decreased pressure sensitivity is multiplied with a decreased pressure amount (e.g., 25%) for which a decreased pressure alarm is desired to be issued, then a decreased pressure threshold value can be calculated in the manner as described below.

Decreased pressure threshold value=0.000908× (0.1433)×25=0.0033

Specifically, in the case of this tire T, the threshold value was automatically set to 0.0033 after the initialization.

Next, the respective types of tires shown in Table 1 were caused to have a 30%-decreased pressure after initialization. Then, the existence or nonexistence of false alarm or no alarm was compared with the case of a conventional method (in which a fixed threshold value calculated by a representative tire was used as a decreased pressure threshold value), the result of which is shown in Table 2.

TABLE 2

| Size | DEL change amount for 30%-decreased pressure | Automatically set threshold value | Result | Fixed threshold value | Result |
|---|---|---|---|---|---|
| 185/70R14 | 0.0030 | 0.0025 | Alarm | 0.0040 | No alarm |
| 195/60R15 | 0.0040 | 0.0033 | Alarm | 0.0040 | Alarm |
| 205/50R16 | 0.0048 | 0.0040 | Alarm | 0.0040 | Alarm |

As shown in Table 2, when a fixed threshold value was used, no alarm (or a false alarm) was caused depending on the setting of the threshold value. However, according to the method of the present invention, a decreased pressure can be determined accurately.

Example 2

In order to obtain the angular velocities of the respective tires attached to a vehicle, rotation speed information used for ABS control was converted to the angular velocities.

An experiment was performed on a FF vehicle with a criterion internal pressure of 200 kPa. Three types of tires (see Table 3) were used in calibration.

Calibration

The three types of tires shown in Table 3 were sequentially attached to a FF vehicle. Then, the vehicle was subjected to calibration in the Okayama test course of Sumitomo Rubber Industries, Ltd. to thereby calculate the representative characteristic value of load sensitivity (the respective coefficients $X_1$ and $X_2$ of the formula (21)) and the decreased pressure sensitivities (see Table 1). Then, the proportional constant between the load sensitivity and the decreased pressure sensitivity was calculated.

The approximate line inclination was calculated with regard to the load sensitivity based on the formula (21). The inclination can be calculated on-line by using the iterative least squares technique for example. Since the coefficient changes only depending on the load sensitivity b, the coefficient was used as a representative characteristic value of the load sensitivity. The term "load sensitivity" herein means to include not only a mere load sensitivity but also a value which changes depending only on the load sensitivity (a parameter consisting of a load sensitivity and a value uniquely determined in the vehicle).

On the other hand, the decreased pressure sensitivity was calculated by actually decreasing the tire pressure by a predetermined amount (e.g., 25%) to calculate the change amounts of the dynamic loaded radii, the results of which are shown in Table 3.

TABLE 3

| Size | Coefficient of $X_1$ (A) | Coefficient of $X_2$ (B) | Decreased pressure sensitivity/% (DEL') |
|---|---|---|---|
| 185/70R14 | $-2.5736 \times 10^{-5}$ | $-7.288 \times 10^{-6}$ | 0.0050 |
| 195/60R15 | $-3.120 \times 10^{-5}$ | $-9.315 \times 10^{-6}$ | 0.0067 |
| 205/50R16 | $-3.870 \times 10^{-5}$ | $-11.40 \times 10^{-6}$ | 0.0080 |

Figure 9:
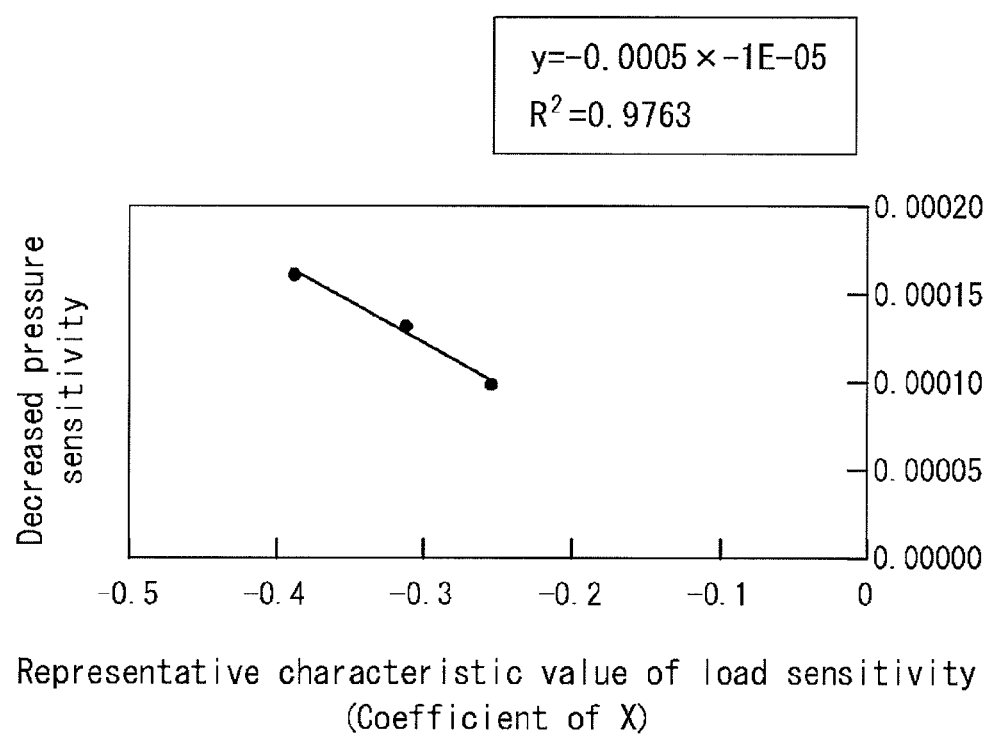
FIG. 9 illustrates the relation between the decreased pressure sensitivity and the representative characteristic value of a load sensitivity (coefficient of X)
Figure 10:
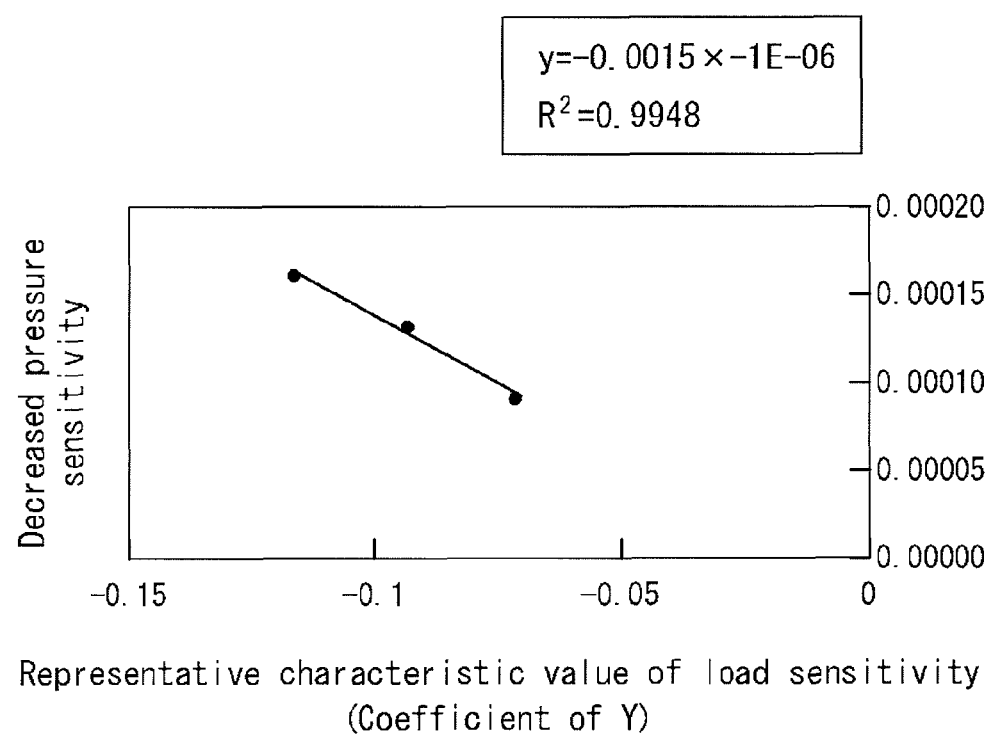
FIG. 10 illustrates the relation between the decreased pressure sensitivity and the representative characteristic value of a load sensitivity (coefficient of Y).

Based on the above calibration result, as shown in FIG. 9 and FIG. 10, the proportional constant of representative characteristic value of load sensitivity (coefficient of $X_1$ and coefficient of $X_2$) and decreased pressure sensitivities was calculated and the value was preset in the storage means. In the present example, the proportional constant for coefficient of $X_1$ was −0.0005 and the proportional constant for coefficient of $X_2$ was −0.0015. Therefore, the following formulae were established.

Decreased pressure sensitivity=−228×(Coefficient of $X_1$)−0.0007     1.

Decreased pressure sensitivity=−729×(Coefficient of $X_2$)−0.00024     2.

Setting of Threshold Value

Certain tires T were attached to the FF vehicle. Then, in the turning running of the initialization, the coefficient of $X_1$ and the coefficient of $X_2$ were calculated as described above. The resultant coefficient of $X_1$ and coefficient of $X_2$ were $-3.27 \times 10^{-5}$ and $-9.12 \times 10^{-6}$, respectively.

When assuming that a decreased pressure amount for which a decreased pressure alarm is desired to be issued is 25%, the decreased pressure sensitivity can be estimated as follows.

Threshold value=25(decreased pressure (%))×decreased pressure sensitivity=25×{−228×(−3.27× $10^{-5}$)−0.0007}=0.17     1.

Threshold value=25(decreased pressure (%))×decreased pressure sensitivity=25×{−729×(−9.12× $10^{-6}$)−0.00024}=0.16     2.

Then, an average value of the values estimated based on the respective coefficients was calculated and was used as a decreased pressure sensitivity estimate value. Specifically, in the case of the tire T of the present example, at the completion of the initialization, the threshold value is automatically set to 0.17(=(0.17+0.16)/2).

Next, the respective tires shown in Table 3 were caused to have a 30%-decreased pressure after initialization. Then, the existence or nonexistence of false alarm or no alarm was compared with the case of a conventional method (in which a fixed threshold value calculated by a representative tire was used as a decreased pressure threshold value), the result of which is shown in Table 4.

TABLE 4

| Size | DEL change amount for 30%-decreased pressure | Automatically set threshold value | Result | Fixed threshold value | Result |
|---|---|---|---|---|---|
| 185/70R14 | 0.15 | 0.14 | Alarm | 0.20 | No alarm |
| 195/60R15 | 0.20 | 0.17 | Alarm | 0.20 | Alarm |
| 205/50R16 | 0.24 | 0.21 | Alarm | 0.20 | Alarm |

As shown in Table 4, when a fixed threshold value was used, no alarm (or a false alarm) was caused depending on the setting of the threshold value. However, according to the method of the present invention, a decreased pressure can be determined accurately.

What is claimed is:

1. A method for detecting a tire having a decreased internal pressure by making a relative comparison of wheel speeds of tires attached to the respective wheels of a vehicle, comprising the steps of:
    detecting wheel rotation information of the respective tires of the vehicle;
    calculating, using a Central Processing Unit (CPU), wheel speeds based on the detected wheel rotation information;
    calculating a decreased pressure determination value by making a relative comparison of the calculated wheel speeds; and
    determining a tire having a decreased internal pressure when the resultant decreased pressure determination value exceeds a predetermined threshold value,
    wherein the method further comprises a step of setting a threshold value, in which the predetermined threshold value is set, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization, and
    wherein the load sensitivity is calculated based on a relational expression between a ratio of the dynamic loaded radius change due to the load shift during turning to the dynamic loaded radius, the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

2. The method for detecting a tire having a decreased internal pressure according to claim 1, wherein the vehicle is a front-wheel drive vehicle or a rear-wheel drive vehicle,
    when assuming that the tire dynamic loaded radius is DLR, the tire dynamic loaded radius change is ΔDLR, the load sensitivity is b, the vehicle gravity center height is H, the vehicle tread width is W, the vehicle mass is m, the vehicle lateral acceleration is $a_y$, and a load shift share rate of a driven wheel axis to all axes is α, the relational expression is represented as:

$$\Delta DLR/DLR = b \times \alpha \times (H/W) \times m \times a_y, \text{ and}$$

the load sensitivity is a representative characteristic value of a load sensitivity represented by b×α×(H/W)×m.

3. The method for detecting a tire having a decreased internal pressure according to claim 2, wherein the load sensitivity during vehicle turning regarding the to-be-attached tires is a representative characteristic value of the load sensitivity, and
    the relation between the load sensitivity and the decreased pressure sensitivity is represented by a linear function of the representative characteristic value and the decreased pressure sensitivity.

4. An apparatus for detecting a tire having a decreased internal pressure, comprising:
    a wheel rotation information detection device configured to detect wheel rotation information of the respective tires of the vehicle; and
    a control unit arranged and configured to
    calculate wheel speeds based on the wheel rotation information detected by the wheel rotation information detection device;
    calculate a decreased pressure determination value by a relative comparison of the calculated wheel speeds; and
    determine, when the resultant decreased pressure determination value exceeds a predetermined threshold value, a tire having a decreased internal pressure,
    wherein the control unit is arranged and configured to set the predetermined threshold value, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization, and
    wherein the control unit is arranged and configured to calculate the load sensitivity based on a relational expression between a ratio of the dynamic loaded radius change due to the load shift during turning to the dynamic loaded radius, the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

5. The apparatus for detecting a tire having a decreased internal pressure according to claim 4, wherein the vehicle is a front-wheel drive vehicle or a rear-wheel drive vehicle,
    when assuming that the tire dynamic loaded radius is DLR, the tire dynamic loaded radius change is ΔDLR, the load sensitivity is b, the vehicle gravity center height is H, the vehicle tread width is W, the vehicle mass is m, the vehicle lateral acceleration is $a_y$, and a load shift share rate of a driven wheel axis to all axes is α, the relational expression is represented as:

$$\Delta DLR/DLR = b \times \alpha \times (H/W) \times m \times a_y, \text{ and}$$

the load sensitivity is a representative characteristic value of a load sensitivity represented by b×α×(H/W)×m.

6. The apparatus for detecting a tire having a decreased internal pressure according to claim 5, wherein the load sensitivity during vehicle turning regarding the to-be-attached tires is a representative characteristic value of the load sensitivity, and
    the relation between the load sensitivity and the decreased pressure sensitivity is represented by a linear function of the representative characteristic value and the decreased pressure sensitivity.

7. A computer program product for detecting a tire having a decreased internal pressure which causes, in order to detect a tire having a decreased internal pressure by making a relative comparison of wheel speeds of tires attached to the respective wheels of a vehicle, the computer program product comprising at least one non-transitory computer-readable storage medium having computer-executable program instructions stored therein, the computer-executable program instructions comprising:
- calculating wheel speeds based on wheel rotation information of respective tires of a vehicle;
- calculating a decreased pressure determination value by a relative comparison of the calculated wheel speeds;
- determining, when the resultant decreased pressure determination value exceeds a predetermined threshold value, a tire having a decreased internal pressure; and
- setting the predetermined threshold value, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization,
- wherein the load sensitivity is calculated based on a relational expression between a ratio of the dynamic loaded radius change due to the load shift during turning to the dynamic loaded radius, the ratio being calculated based on a yaw rate and a lateral acceleration obtained from a yaw rate sensor and a lateral acceleration sensor mounted in the vehicle and wheel speeds of left and right wheels of the vehicle, and a lateral acceleration.

8. A method for detecting a tire having a decreased internal pressure by making a relative comparison of wheel speeds of tires attached to the respective wheels of a front-wheel drive vehicle or a rear-wheel drive vehicle, comprising the steps of:
- detecting wheel rotation information of the respective tires of the vehicle;
- calculating, using a Central Processing Unit (CPU), wheel speeds based on the detected wheel rotation information;
- calculating a decreased pressure determination value by making a relative comparison of the calculated wheel speeds; and
- determining a tire having a decreased internal pressure when the resultant decreased pressure determination value exceeds a predetermined threshold value,
- wherein the method further comprises a step of setting a threshold value, in which the predetermined threshold value is set, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization, and
- wherein the load sensitivity is estimated by comparison between change amounts of dynamic loaded radii of left and right driven wheels during vehicle turning obtained from the wheel speeds and change amounts of dynamic loaded radii of left and right driving wheels during vehicle turning obtained from the wheel speeds, and is a regression coefficient obtained by the following formula, provided that $\omega R$ and $\omega L$ are wheel speeds of right and left wheels of the driven wheel (idler) and the driving wheel (drive):

$$Y = AX_1 + BX_2 + CX_3,$$

wherein, $$Y = \left[\frac{(\omega R - \omega L)}{(\omega R + \omega L)}\right]_{drive} - \left[\frac{(\omega R - \omega L)}{(\omega R + \omega L)}\right]_{idler},$$

$$X_1 = (\omega R + \omega L)^2 \left(\left[\frac{(\omega R - \omega L)}{(\omega R + \omega L)}\right]_{drive} - \left[\frac{(\omega R - \omega L)}{(\omega R + \omega L)}\right]_{idler}\right),$$

$$X_2 = (\omega R + \omega L)(\omega R - \omega L), \text{ and}$$

$$X_3 = \left(\frac{(\omega R + \omega L)_t - (\omega R + \omega L)_{t-1}}{\Delta t}\right)(\omega R + \omega L)(\omega R + \omega L).$$

9. An apparatus for detecting a tire having a decreased internal pressure by making a relative comparison of wheel speeds of tires attached to the respective wheels of a front-wheel drive vehicle or a rear-wheel drive vehicle, the apparatus comprising:
- a wheel rotation information detection device configured to detect wheel rotation information of the respective tires of the vehicle; and
- a control unit arranged and configured to
- calculate wheel speeds based on the detected wheel rotation information detected by the wheel rotation information detection device;
- calculate a decreased pressure determination value by making a relative comparison of the calculated wheel speeds; and
- determine a tire having a decreased internal pressure when the resultant decreased pressure determination value exceeds a predetermined threshold value,
- wherein the control unit is arranged and configured to set a threshold value, in which the predetermined threshold value is set, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization, and
- wherein the control unit is arranged and configured to estimate the load sensitivity by comparison between change amounts of dynamic loaded radii of left and right driven wheels during vehicle turning obtained from the wheel speeds and change amounts of dynamic loaded radii of left and right driving wheels during vehicle turning obtained from the wheel speeds, and is a regression coefficient obtained by the following formula, provided that $\omega R$ and $\omega L$ are wheel speeds of right and left wheels of the driven wheel (idler) and the driving wheel (drive):

$$Y = AX_1 + BX_2 + CX_3,$$

wherein, $$Y = \left[\frac{(\omega R - \omega L)}{(\omega R + \omega L)}\right]_{drive} - \left[\frac{(\omega R - \omega L)}{(\omega R + \omega L)}\right]_{idler},$$

$$X_1 = (\omega R + \omega L)^2 \left(\left[\frac{(\omega R - \omega L)}{(\omega R + \omega L)}\right]_{drive} - \left[\frac{(\omega R - \omega L)}{(\omega R + \omega L)}\right]_{idler}\right),$$

$$X_2 = (\omega R + \omega L)(\omega R - \omega L), \text{ and}$$

$$X_3 = \left(\frac{(\omega R + \omega L)_t - (\omega R + \omega L)_{t-1}}{\Delta t}\right)(\omega R + \omega L)(\omega R + \omega L).$$

10. A computer program product for detecting a tire having a decreased internal pressure by making a relative comparison of wheel speeds of tires attached to the respective wheels of a front-wheel drive vehicle or a rear-wheel drive vehicle, the computer program product comprising at least one non-transitory computer-readable storage medium having computer-executable program instructions stored therein, the computer-executable program instructions comprising:

calculating wheel speeds based on the detected wheel rotation information of respective tires of a vehicle;

calculating a decreased pressure determination value by making a relative comparison of the calculated wheel speeds;

determining a tire having a decreased internal pressure when the resultant decreased pressure determination value exceeds a predetermined threshold value; and setting the predetermined threshold value, during initialization, based on a decreased pressure sensitivity calculated from a relation between a load sensitivity and a decreased pressure sensitivity during vehicle turning that is calculated in advance in a calibration phase and a load sensitivity obtained through a turning running during initialization, wherein the load sensitivity is estimated by comparison between change amounts of dynamic loaded radii of left and right driven wheels during vehicle turning obtained from the wheel speeds and change amounts of dynamic loaded radii of left and right driving wheels during vehicle turning obtained from the wheel speeds, and is a regression coefficient obtained by the following formula, provided that $\omega R$ and $\omega L$ are wheel speeds of right and left wheels of the driven wheel (idler) and the driving wheel (drive):

$$Y = AX_1 + BX_2 + CX_3,$$

wherein, $$Y = \left[\frac{(\omega R - \omega L)}{(\omega R + \omega L)}\right]_{drive} - \left[\frac{(\omega R - \omega L)}{(\omega R + \omega L)}\right]_{idler},$$

$$X_1 = (\omega R + \omega L)^2 \left(\left[\frac{(\omega R - \omega L)}{(\omega R + \omega L)}\right]_{drive} - \left[\frac{(\omega R - \omega L)}{(\omega R + \omega L)}\right]_{idler}\right),$$

$$X_2 = (\omega R + \omega L)(\omega R - \omega L), \text{ and}$$

$$X_3 = \left(\frac{(\omega R + \omega L)_t - (\omega R + \omega L)_{t-1}}{\Delta t}\right)(\omega R + \omega L)(\omega R + \omega L).$$

* * * * *